United States Patent [19]

Speranza et al.

[11] Patent Number: 5,324,812
[45] Date of Patent: Jun. 28, 1994

[54] WATER SOLUBLE POLYAMIDE FROM POLYALKYLENE GLYCOL DIAMINES AND POLYCARBOXYLIC ACIDS

[75] Inventors: George P. Speranza; Christopher S. Henkee, both of Austin, Tex.

[73] Assignee: Texaco Chemical Company, White Plains, N.Y.

[21] Appl. No.: 41,104

[22] Filed: Apr. 1, 1993

[51] Int. Cl.$^5$ .............................................. C08G 69/34
[52] U.S. Cl. ................................... 528/338; 528/335; 528/339; 528/339.3; 528/340; 528/347
[58] Field of Search ............ 528/340, 338, 339, 339.3, 528/347, 335

[56] References Cited

U.S. PATENT DOCUMENTS

| | | | |
|---|---|---|---|
| 3,945,983 | 3/1976 | Hoppe et al. | 260/78 L |
| 3,989,678 | 11/1976 | Furukawa et al. | 260/78 L |
| 4,024,116 | 5/1977 | Horn et al. | 260/78 L |
| 4,062,819 | 12/1977 | Mains et al. | 260/18 N |
| 4,128,525 | 12/1978 | Yeakey et al. | 260/29.1 R |
| 4,150,002 | 4/1979 | Drawert et al. | 260/18 N |
| 4,162,931 | 7/1979 | Yeakey et al. | 156/331 |
| 4,182,845 | 1/1980 | Yeakey et al. | 528/340 |
| 4,217,256 | 8/1980 | Peerman et al. | 260/18 N |
| 4,229,567 | 10/1980 | Sharkey | 528/338 |
| 4,452,974 | 6/1984 | Goletto et al. | 528/339.3 |
| 5,053,484 | 10/1991 | Speranza et al. | 528/340 |
| 5,086,162 | 2/1992 | Speranza et al. | 528/339 |
| 5,118,785 | 6/1992 | Speranza et al. | 528/347 |

OTHER PUBLICATIONS

A. Hardy, "Polyester, Polyamide and Polyurethane Melt Adhesives," *Crit. Prep. Appl. Chem.*, vol. 16, 1987, pp. 31–58.

A. T. Hu, et al., "Preparation of Block Copolyetheramides and their Properties as Hot Melt Adhesives," *Journal of Applied Polymer Science*, vol. 37, 1989, pp. 1863–1876.

G. Russel, "Water Soluble Hot Melts," *Materiaux et Techniques*, Mar.–Apr. 1990, pp. 57–58.

Primary Examiner—Harold D. Anderson
Attorney, Agent, or Firm—James L. Bailey; Kenneth R. Priem; David L. Mossman

[57] ABSTRACT

Water soluble polyamides may be produced by reacting two different dicarboxylic acids with at least one low molecular weight poly(alkylene glycol) diamine and at least one relatively high molecular weight polyoxyalkylene diamine. One dicarboxylic acid may be of low molecular weight, such as adipic acid and the other of relatively high molecular weight such as $C_{36}$ dimer acid. In one embodiment, some dimer acid proportion is preferred. The poly(alkylene glycol) diamine may include triethylene glycol diamine and tetraethylene glycol diamine. The polyoxyalkylene diamine should have at least some ethylene oxide residue therein; for example it may be a polyoxyethylene/polyoxypropylene diamine. The resulting polyamides have a desirable combination of properties, including high strength with water solubility, the latter making the materials easier to work with and very useful.

14 Claims, 1 Drawing Sheet

WATER SOLUBLE POLYAMIDE FROM POLYALKYLENE GLYCOL DIAMINES AND POLYCARBOXYLIC ACIDS

FIELD OF THE INVENTION

The invention relates to novel polyamides, and, in one aspect, more particularly to new water soluble polyamides made using at least one dicarboxylic acid and two different poly(alkylene glycol) diamines. At least one of the poly(alkylene glycol) diamines must have some ethoxy moieties in the chain.

BACKGROUND OF THE INVENTION

The versatility of polyamides has led to their use in applications ranging from structural components to hot melt adhesives. Part of this versatility arises from the fact that the composition of the backbone of the polymer can be varied to yield specific properties by adjusting the components from which the polymer is synthesized. Currently, several nylon manufacturers incorporate polyoxyalkyleneamines into their products to modify the final properties. The polyether backbone of these components improves the comfort feel, wickability and dyeability of textile grades. In general, polyetheramines improve impact and antistatic properties of nylon.

A. Hardy, "Polyester, Polyamide and Polyurethane Melt Adhesives," *Crit. Prep. Appl. Chem.*, Vol. 16, 1987, pp. 31-58 gives an overview of a number of adhesive types. The descriptions of polyamides begins on page 45 and polyether-containing polyamides are mentioned on page 49. It is noted that polyamide resins can also be made water soluble, but it is not described how this is done. This survey gives a brief description of technology described in U.S. Pat. Nos. 4,128,525; 4,162,931 and 4,182,845. These patents involve thermoplastic adhesive components, prepared from inexpensive and readily available synthetic materials, having melting points between about 20° C. to about 180° C. and broad ranges of hardness, flexibility and compatibility. The thermoplastic compounds useful in adhesive formulations are comprised of a resinous polyamide reaction product of a polyoxypropylene polyamine having an average molecular weight of from about 190 to about 3,000 and being selected from diamines, triamines or mixtures thereof, piperazine and an aliphatic or aromatic dicarboxylic acid, ester or anhydride having from about 4 to about 20 carbon atoms per molecule. The resinous polyamide reaction product is prepared by mixing and reacting the polyoxypropylene polyamine, piperazine and dicarboxylic acid materials in a total amine:acid molar ratio within the range of from about 0.25:1.0 to about 4.0:1.0 at a temperature of from about 175° to about 270° C. The thermoplastic polyamides can be formulated with compatible plasticizing agents to prepare a useful adhesive to which can also be added other components, such as a minor amount of a polyepoxide resin having an epoxide equivalent weight of about 150 to about 600, fillers and the like to produce thermoplastic adhesive formulations having desired hardness, flexibility and compatibility that are capable of bonding together a variety of substrates.

Block copolyetheramides were prepared by incorporating polyether into polyamide through melt polycondensation of polyetherdiamine, piperazine, dimer acid and ε-caprolactam, according to A. T. Hu, et al., "Preparation of Block Copolyetheramides and their Properties as Hot Melt Adhesives," *Journal of Applied Polymer Science*, Vol. 37, pp. 1863-1876 (1989). Bulk properties of block copolyetheramide, such as tensile strength, tensile modulus, elongation at break, hardness and impact strength, were evaluated with respect to composition. Investigation on the lap shear strength and T-peel strength of block copolyetheramide hot melt adhesive showed that the lap shear strength was more composition-dependent.

G. Russel in "Water Soluble Hot Melts," *Materiaux et Techniques*, March-April 1990, pp. 57-58 mentions the need for adhesives which are affected by water including total solubility thereof, and goes on to describe polyvinylpyrrolidine/vinyl acetate copolymers, some of which are water soluble.

Patents of particular interest include U.S. Pat. No. 4,229,567 which discusses that copolyamides derived from a mixture of short-chain and long-chain saturated aliphatic dicarboxylic acids, piperazine and a polyoxyalkylene diamine are excellent hot melt adhesives useful with a variety of substrates. These thermoplastic copolyamide resins are particularly useful adhesives for vinyl materials and are resistant to creep.

A hot-melt adhesive comprising copolyamides obtained from (a) ε-caprolactam, (b) diamine salts of adipic acid, sebacic acid and/or azelaic acid and (c) alkylenedicarboxylic acid salts of polyether-diamines gives e.g. textile laminates which are particularly resistant to washing and dry cleaning, according to U.S. Pat. No. 4,024,116.

Other relevant patent literature includes U.S. Pat. No. 3,945,983 which describes a process for the production of an anchoring agent of copolyamide resin by condensing certain amounts of polyalkylene polyamines, dicarboxylic acids and at least one member of the group of diamine, ε-caprolactam and amino caproic acid, and then reacting the secondary amino groups of the copolyamide partially with epichlorohydrin for crosslinking.

U.S. Pat. No. 3,989,678 discusses a hot melt adhesive which comprises a copolyamide consisting essentially of (1) ε-caprolactam, (2)(a) hexamethylenediamine and (b) at least one straight chain, saturated aliphatic dicarboxylic acid having 6 to 20 carbon atoms in a substantially equimolar ratio and (3)(a) at least one of 2,2,4-trimethylhexamethylenediamine and 2,4,4-trimethylhexamethylenediamine and (b) at least one straight chain, saturated aliphatic dicarboxylic acid having 6 to 20 carbon atoms in a substantially equimolar ratio; all being within certain proportions.

The flow characteristics and rheological properties of high molecular weight thermoplastic polyamides are significantly improved by blending therewith a small amount of a polyamide derived from high molecular weight dibasic acids as disclosed by U.S. Pat. No. 4,062,819. In addition to improving the processability of the thermoplastic resin, the blends and manufactured articles produced therefrom have other desirable properties.

U.S. Pat. No. 4,150,002 mentions polyamides and polyesteramides having melt viscosities from 25 to 600 Pa.s at 220° C. and useful as melt adhesives for textiles. The materials are condensation products formed between (a) a dimerized fatty acid component containing at least 70 percent of dimeric acid; (b) a $C_6$–$C_{13}$ aliphatic straight-chain codicarboxylic acid; (c) a $C_6$–$C_{12}$ aliphatic straight-chain diprimary diamine; and (d) caprolactam and/or ε-aminocaproic acid. The polyesteramides additionally contain a further component (e) which is caprolactone and/or ε-hydroxycaproic acid.

A polyamide adhesive for bonding fabrics, particularly fusible interliners for fabrics, which are cleanable by laundering and/or dry cleaning is disclosed in U.S. Pat. No. 4,217,256. The polyamide adhesive is a terpolyamide of caprolactam and hexamethylene diamine with a mixture of polymeric fat acids and an aliphatic co-dicarboxylic acid having 20-22 carbon atoms.

Flexible, homogeneous and transparent copolyamides comprise the polycondensation products of adipic acid, fatty acid dimer and hexamethylenediamine according to U.S. Pat. No. 4,452,974, where the molar ratio of weight of adipic acid to weight of total acid in each ranges from about 0.5 to 0.99. The copolyamides are prepared either by polycondensing a homogenized prepolymer thereof, or by directly copolycondensing a homogeneous, inert solvent solution of monomers. The homogeneous and transparent copolyamides exhibit improved flexibility and high tenacity coupled with good resistance to hydrolysis and good heat resistance, with the copolyamides being useful for providing shaped articles such as moldings, films or filaments of marked uniformity via injection molding, extrusion or spinning.

U.S. Pat. No. 5,086,162 to Texaco Chemical Company describes novel polyether amides produced by reacting at least one polyalkylene glycol diamine with at least two dicarboxylic acids or esters thereof. The polyethylene glycol diamine has the formula $NH_2-(CH_2CH_2O)_xCH_2CH_2NH_2$ where x ranges from 2 to 6, and at least one of the dicarboxylic acids is an aromatic dicarboxylic acid. Suitable dicarboxylic acids include adipic acid, azelaic acid, sebacic acid, dodecanedioic acid, terephthalic acid, isophthalic acid, t-butyl isophthalic acid and mixtures thereof. Suitable diamines include triethylene glycol diamine (JEFFAMINE® EDR-148 amine) and tetraethylene glycol diamine (JEFFAMINE® EDR-192 amine), among others. The resulting polyether amides are useful to make polymers, including fibers, with unusually good water absorbancy properties. The described methods successfully incorporated triethylene glycol diamine and aromatic dibasic acids, where this cannot be accomplished directly.

Polyether amides may be produced by reacting aromatic dicarboxylic acids with tetraethylene glycol diamine according to U.S. Pat. No. 5,118,785, also to Texaco Chemical Co. This discovery was noted as surprising since aromatic dicarboxylic acids, such as terephthalic acid cannot readily be reacted with triethylene glycol diamine. Suitable dicarboxylic acids include terephthalic acid, isophthalic acid, t-butyl isophthalic acid and mixtures thereof. The resulting polyether amides are useful to make polymers, including fibers, with unusually good water absorbancy properties.

Dimer acids, obtained by the dimerization of $C_{18}$ acids such as oleic acid and linoleic acid are especially useful for the preparation of water insoluble hot melt adhesives. These dimer acids have as their main components $C_{36}$ dicarboxylic acids and $C_{54}$ tricarboxylic acids. Polyamides made from these acids for the hot melt industry are used in laminating metals, plastics and shoe soles to uppers. The resin is applied in liquid melted form and adhesion occurs almost instantly; cooling results in a strong adhesive bond.

It would be desirable to make water soluble polyamides from dimer acid so that one could take advantage of the desirable properties this dibasic acid brings to such products.

SUMMARY OF THE INVENTION

Accordingly, it is an object of the present invention to provide novel polyether amides with polyether segments derived from poly(alkylene glycol) diamines, polyoxyalkylenediamines and polyamide segments.

It is another object of the present invention to provide novel water soluble polyether amides.

A particular object of the invention is to provide a way to produce water soluble polyether amides containing moieties from relatively large aliphatic dicarboxylic acids.

In carrying out these and other objects of the invention, there is provided, in one form, a water soluble polyamide produced by reacting (i) at least one aliphatic dicarboxylic acid having from 5 to 36 carbon atoms, (ii) at least one poly(alkylene glycol) diamine having the formula:

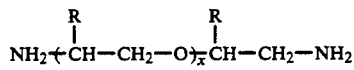

where x ranges from about 2 to 5, R is hydrogen or an alkyl of one to four carbon atoms; and (iii) at least one polyoxyalkylene diamine having the formula:

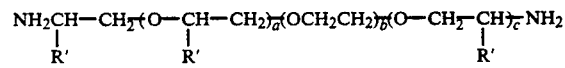

where the sum of a+c ranges from about 2 to 8, b ranges from about 12 to about 50 and R' is an alkyl group of one to four carbon atoms.

DETAILED DESCRIPTION OF THE INVENTION

Figure 1:
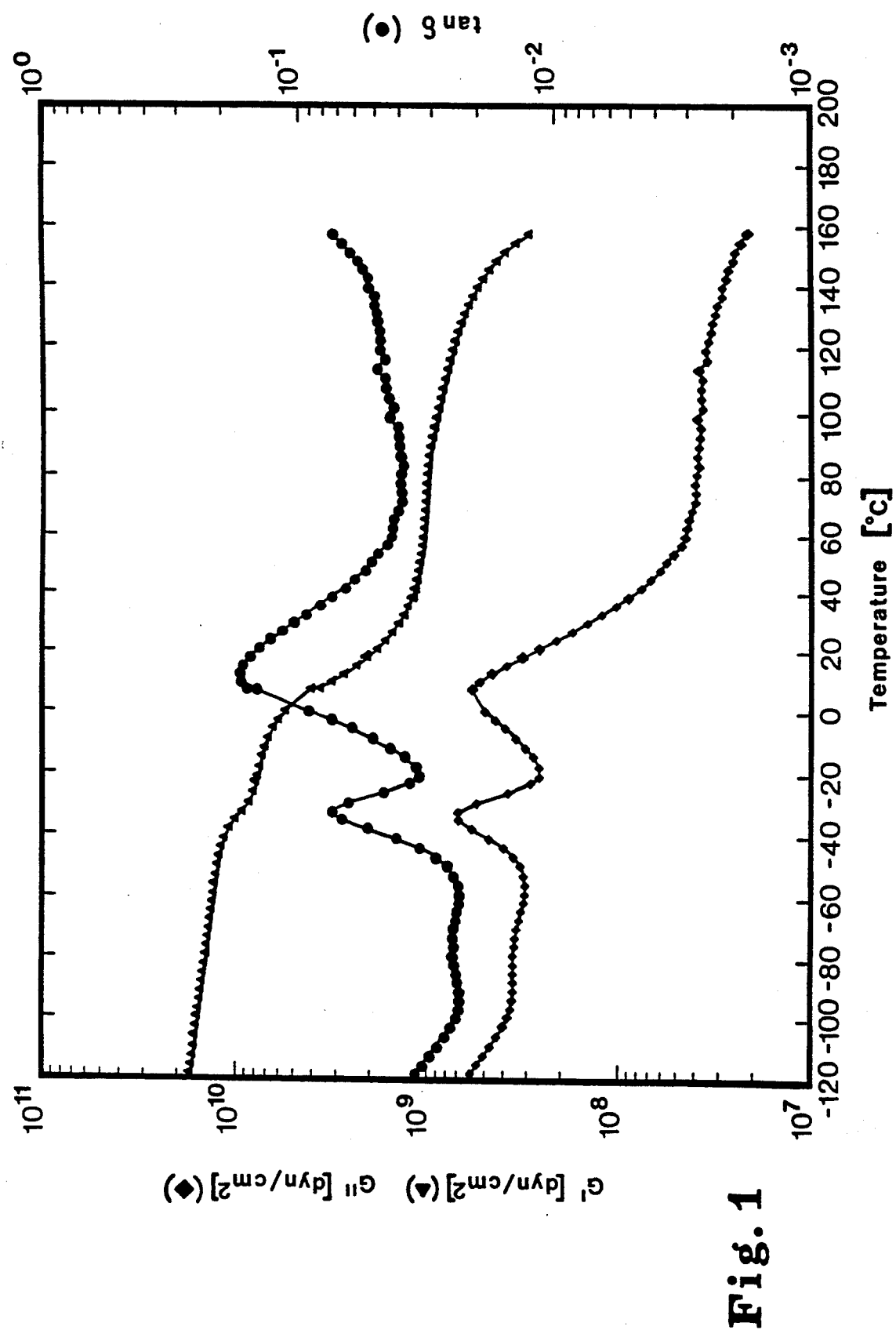
FIG. 1 is a dynamical mechanical spectrum (DMS) for the polyamide based on Example 21.

The combination of certain dicarboxylic acids condensed with materials such as triethylene glycol diamine or tetraethylene glycol diamine, in combination with polyoxyalkyleneamines, results in polyamides with various properties, the most unusual of which may be water solubility. As such, these water soluble polymers should find use as lubricants, mold release agents, disposable items (e.g. plastic containers, medical disposables, cosmetic containers, etc.), water thickeners, encapsulants for insecticides, fertilizers, detergents, ink carriers or as temporary protective coatings. In addition, these water soluble polyamides should be particularly attractive for use in hot melt adhesive formulations. In such an application, water solubility may be desired for use in gummed label formulations, in temporary textile bonding adhesives or as bottle label adhesives. Polyamides have long been known as possessing ideal properties for hot melt applications, however, to date if water solubility was desired, it was necessary to turn to other classes of polymers.

Suitable dicarboxylic acids for the water soluble acids are those having from 5 to 36 carbon atoms and include, but are not necessarily limited to adipic acid, pimelic acid, azelaic acid, sebacic acid, dodecanedioic acid, terephthalic acid, isophthalic acid, t-butyl isophthalic acid, dimer acid and mixtures thereof. The esters and anhydrides of these acids may also be used. It is also preferred, in one embodiment, that the dicarboxylic acid not possess reactive groups other than the acid groups, at least groups that readily react with primary amine functionalities.

In a preferred embodiment of the invention, at least two dicarboxylic acids are used, a relatively low molecular weight one and a relatively high molecular weight one. The relatively low molecular weight acid may have from 5 to 12 carbon atoms and include, as non-limiting examples, adipic acid, pimelic acid, azelaic acid, sebacic acid, dodecanedioic acid, terephthalic acid, isophthalic acid, t-butyl isophthalic acid, and mixtures thereof. Adipic acid is particularly preferred. The higher molecular weight acid may have from 20 to 36 carbon atoms and is exemplified, but not limited to, dimer acid. Commercial Empol 1010 from Emery Industries, Inc., containing about 97% dibasic acid (but also some tribasic acid) was used in the Examples of this invention.

The relatively low molecular weight poly(alkylene glycol) diamine useful in the invention has the formula:

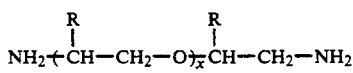

where x is from about 2 to 5, R is hydrogen or an alkyl of one to four carbon atoms and the polyethylene glycol diamine has a $M_w$ of at least 400 with a mixture of ethylene oxide and propylene oxide. In a preferred embodiment of the invention, R is hydrogen. Also, x preferably averages from about 2 to about 3. When R is hydrogen and x is 2, the material is triethylene glycol diamine (JEFFAMINE ® EDR-148 amine). When R is hydrogen and x is 3, the reactant is tetraethylene glycol diamine (JEFFAMINE ® EDR-192 amine). It will be appreciated that throughout this description x is understood to be an average value of the distribution of polymers present, rather than an absolute number indicating a completely pure material.

The polyoxyalkylene diamine reactants useful in this invention have the structure:

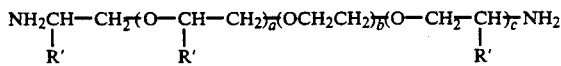

where the sum of a+c ranges from about 2 to about 8, b ranges from about 12 to about 50 and R' is an alkyl group of one to four carbon atoms. Again, a, b and c are to be understood as average values in many instances. In a preferred embodiment, the ethylene oxide moieties denoted by b represent at least 50% of the molecule. Stated in another way, this could be represented as:

$$\frac{b}{a+c} \geqq 0.5$$

The JEFFAMINE ED series diamines fall within this definition:

| | a + c = | b = |
|---|---|---|
| JEFFAMINE ED-600 | 3.5 | 13.5 |
| JEFFAMINE ED-900 | 3.5 | 20.5 |
| JEFFAMINE ED-2001 | 3.5 | 45.5 |

More than one polyoxyalkylene diamine within this definition may be used as desired to affect the properties of the final polyamide. Preferably, R' is methyl and the sum of a+c ranges from about 3 to 4. Alternatively, a and c are independently 1 or 2 and some, but not all, of the ethoxy moiety subscripted by b could be propoxy. The polyoxyalkylene diamine cannot be the same as the poly(alkylene glycol) diamine. The ethylene oxide moieties denoted by b need not necessarily be located in the middle of the molecule, and under the definition of this invention, the moieties represented by a, b and c may be distributed randomly or in blocks.

In general, the water solubility of the resulting polyamide monomers increases with increasing ethylene oxide (EO) moiety content. The incorporation of the EO moiety content is achieved primarily through the relatively high molecular weight polyoxyalkylene diamine, but may also be achieved in part through the incorporation of a poly(ethylene glycol) diamine. Also, as the size of the dicarboxylic acids employed increases, a greater proportion of ethylene oxide moiety is necessary to achieve water solubility of the resulting polyamide. It is difficult, however, to predict exactly how many moles of EO moiety is necessary in each or one of the two diamines employed to achieve a water solubility with a given dicarboxylic acid or combination of dicarboxylic acids. Conducting an experiment using the actual ratios of interest is the best way to determine if a water soluble material will result. To someone skilled in the art, it will be possible to make water dispersable polyamides by suitable choice of these reactants and ratios which are outside the water soluble range.

As will be seen, in one embodiment of the invention, the mole ratio of dicarboxylic acid to polyoxyalkylene diamine, and mole ratio of poly(alkylene glycol) diamine to polyoxyalkylene diamine are both at least 4:1. When a second dicarboxylic acid is used, and it is the larger dibasic acid, it may be in a ratio to the polyoxyalkylene diamine of about 1:1, in one embodiment. Most preferably, in another embodiment of the invention, these ratios of dibasic acid and poly(alkylene glycol) diamine to polyoxyalkylene diamine are at least 10:1. However, it will be understood that these ratios may be adjusted within wide parameters in accordance with the properties desired by the resulting water soluble polyamide block copolymer.

In general, the reaction to make the compositions of this invention may be conducted at a temperature between about 220° and about 280° C. and a pressure between about 0.1 mm to about 100 psig. No catalyst is required for this reaction, although one may be yet discovered that might prove beneficial. The products are generally light-colored solids.

The water soluble polyamides of this invention combine a variety of desirable properties. First, the water solubility of the polyamides makes them easier to work with. Second, the use of one or more dicarboxylic acids provides the strength of nylons. The use of dicarboxylic acids as large as dimer acids, which are not water soluble, destroys the crystallinity of the conventional polyamides into which they are incorporated. The result is that when the adhesive systems set they do not freeze suddenly and thus are not brittle and not subject to breaking upon jarring or shock. The softening points of the products can be varied widely using two or more diamines and other dibasic acids along with the dimer acid.

The products and methods of this invention will be described in more detail with reference to the following Examples, which are illustrative and are not limiting upon the claimed invention.

Procedure

Because a considerable number of experiments had to be performed to find out what combinations were water soluble, the preparations of the polyamides were carried out on a small scale. Example 21 will describe the technique used. To a small glass reactor was added the following:

|  | grams | moles |
|---|---|---|
| JEFFAMINE EDR-148 diamine | 0.592 | 0.004 |
| Adipic acid | 0.584 | 0.004 |
| Dimer acid | 0.23 | 0.0004 |
| JEFFAMINE ED-600 diamine | 0.24 | 0.0004 |
| Irganox 1098 (Ciba-Geigy)-antioxidant | 0.03 | |
| Water | 1.09 | |

The contents in the reactor tube were placed in a silicone oil bath. A nitrogen flow was passed over the reactants. The contents were heated to 180° C. and held at this temperature for 30 minutes. The nitrogen inlet tube was placed into the molten reactants and the temperature was raised to 240° C. and held at this temperature for three hours (the material was a pale golden viscous liquid). Upon cooling the product stuck to the glass reactor and cracked the reactor. The material was completely soluble in water. Generally, a reaction temperature of between 240° C. and 250° C. was used for all reactions. The samples were tested for their thermal properties by DSC, as well as for their water solubility characteristics.

For those samples which appeared as useful candidates for hot melt adhesives, larger quantities were synthesized in a two liter stirred autoclave. The reactants were typically added to the reactor, after which the reactor and contents were purged with purified nitrogen for ten minutes. The reactor was then heated to the reaction temperature. Torque was monitored at the stirrer to allow viscosity to be monitored. After a time of three hours, the molten polymer was extruded from the bottom of the reactor, and dried thoroughly in a vacuum desiccator.

CHaracterization

The melting points and glass transition temperatures were measured using a Mettle differential scanning calorimeter (DSC). Samples were first heated to 250° C., cooled to −120° C., and then scanned from −120° to 250° C. at 10°/min.

Water solubility was checked by dissolving a small amount of the polymer in de-ionized water and checking for clarity of solution. Rates of dissolution typically ranged from a few minutes to a few hours for a 0.2 g sample in about 70 ml of water.

TABLE I

Polyether Polyamides from One Dibasic Acid

| Ex. | Dibasic Acid | Diamine | Water Soluble? | $T_g$ (°C.) | $T_m$ (°C.) |
|---|---|---|---|---|---|
| 1 | Adipic | EDR-148 | Yes | 13 | 186 |
| 2 | " | EDR-192 | " | −2 | 136 |
| 3 | " | D-190 | " | 37 | — |
| 4 | " | D-230 | " | — | — |
| 5 | " | D-400 | " | −19.5 | — |
| 6 | " | ED-600 | " | −41 | — |
| 7 | " | ED-900 | " | −49 | 15 |
| 8 | " | ED-2001 | " | −33 | 39 |
| 9 | Azelaic | D-400 | No | −26 | — |
| 10 | " | EDR-148 | No | — | 159 |
| 11 | " | EDR-192 | No | — | 133 |
| 12 | " | ED-600 | Yes | −44 | — |
| 13 | " | ED-900 | Yes | −51 | 14 |
| 14 | " | ED-2001 | Yes | −38 | 39 |
| 15 | Dodecanedioic | D-400 | No | −29 | 37 |
| 16 | " | ED-600 | Yes | −45 | 39 |
| 17 | " | ED-900 | Yes | −52 | 28/15 |
| 18 | " | ED-2001 | Yes | −33 | 38 |
| 19 | Dimer Acid (C$_{36}$) | ED-600 | No | −48 | — |
| 20 | " | ED-900 | No | −53 | 14 |
| 21 | " | ED-2001 | Yes | −36 | 36 |

TABLE II

Thermal Properties (°C.) of Various Diamine Diacid Polyamides

| ↓ Diacid | Diamine → | EDR 148 | EDR 192 | ED 600 | ED 900 | ED 2001 |
|---|---|---|---|---|---|---|
| Adipic | $T_m$ | 186 | 136 | — | 15 | 39 |
|  | $T_g$ | 13 | −2 | −41 | −49 | −33 |
|  | (Ex.) | (1) | (2) | (6) | (7) | (8) |
| Azelaic | $T_m$ | 159 | 133 | — | 14 | 39 |
|  | $T_g$ | — | — | −44 | −51 | −38 |
|  | (Ex.) | (10*) | (11*) | (12) | (13) | (14) |
| Dodecane-dioic | $T_m$ | 159 | 114 | 39 | 28/15 | 38 |
|  | $T_g$ | — | — | −45 | −52 | −33 |
|  | (Ex.) | (*) | (*) | (16) | (17) | (18) |
| C$_{36}$ Dimer | $T_m$ | 51 | — | — | 14 | 36 |
|  | $T_g$ | −19 | −20 | −48 | −53 | −36 |
|  | (Ex.) | (*) | (*) | (19*) | (20*) | (21) |

*denotes water insoluble.

Table II displays the thermal and the water solubility characteristics of a number of polyether polyamides based on a single dicarboxylic acid and a single diamine, most of which were reported in Table I. It was found that as the molecular weight of the dicarboxylic acid was increased, it was necessary to use a higher molecular weight polyoxyalkylene diamine to ensure water solubility. This trend can be understood in terms of the increased hydrophobicity of the acid as the aliphatic nature increases. It appears that it is possible to overcome this increased hydrophobicity by using a more hydrophilic polyoxyalkylene diamine.

Table II also reveals that many of the polyamides were amorphorous in nature. Separate evidence indicates that the 15° C. melting temperature of the polyamides based on ED-900 and the 38° C. melting points for those polyamides based on ED-2001 are the melting transitions of the polyoxyalkylene diamine, i.e., the polyethylene oxide center of the molecule is capable of crystallizing and this is the transition that is being detected. It should also be seen that the $T_g$ noted in these Tables refers to the transition that is detectable by DSC. It is believed that this $T_g$ is due to the polyether component. (Generally, the pure polyoxyalkylene diamines have $T_g$s near $-70°$ C.) As the triethylene glycol amine/adipic acid and the tetraethylene glycol amine/adipic acid polymers revealed relatively high melting points (186° C. and 136° C., respectively), it was decided to use these two polymers as the basis of a series of polyether heteropolyamides. The thermal and water solubility characteristics of these polymers are shown in Tables III–IV.

TABLE III

Polyether Polyamides from Dimer Acid and Adipic Acid

| Ex. | Dibasic Acid (moles) | | Diamine (moles) | | Water Soluble | $T_g$ (°C.) | $T_m$ (°C.) |
|---|---|---|---|---|---|---|---|
| 21 | Adipic (10) | Dimer (1) | EDR-148 (10) | ED-600 (1) | Yes | −30 | 183 |
| 22 | Adipic (4) | Dimer (1) | EDR-148 (4) | ED-600 (1) | Yes | −30 | 178 |
| 23 | Adipic (2) | Dimer (1) | EDR-148 (2) | ED-600 (1) | No | −29 | 174 |
| 24 | Adipic (10) | Dimer (1) | EDR-148 (10) | ED-900 (1) | Yes | −39 | 181 |
| 25 | Adipic (4) | Dimer (1) | EDR-148 (4) | ED-900 (1) | Yes | −41 | 182 |
| 26 | Adipic (2) | Dimer (1) | EDR-148 (2) | ED-900 (1) | No | −39 | 182 |
| 27 | Adipic (10) | Dimer (1) | EDR-148 (10) | ED-2001 (1) | Yes | −13 | 184 |
| 28 | Adipic (4) | Dimer (1) | EDR-148 (4) | ED-2001 (1) | Yes | −29 | 183 |
| 29 | Adipic (2) | Dimer (1) | EDR-148 (2) | ED-2001 (1) | Yes | −41 | 189 |

TABLE IV

Thermal Properties (°C.) of Various Polyamides Using Triethylene Glycol Diamine

| Molar Ratio: Adipic Acid-EDR 148 to Dimer Acid-Polyetheramine | | Polyoxyalkylene Diamine | | |
|---|---|---|---|---|
| | | ED 600 | ED 900 | ED 2001 |
| 10:1 | $T_m$ | 183 | 181 | 184/38 |
| | $T_g$ | −30 | −39 | −13 |
| | (Ex.) | (21) | (24) | (27) |
| 4:1 | $T_m$ | 178 | 182 | 183/40 |
| | $T_g$ | −30 | −41 | −29 |
| | (Ex.) | (22) | (25) | (28) |
| 2:1 | $T_m$ | 174 | 182 | 184/38 |
| | $T_g$ | −29 | −39 | −41 |
| | (Ex.) | (23*) | (26*) | (29) |

*denotes water insoluble.

TABLE V

Polyether Polyamides from Dimer Acid and Adipic Acid

| Ex. | Dibasic Acid (moles) | | Diamine (moles) | | Water Soluble | $T_g$ (°C.) | $T_m$ (°C.) |
|---|---|---|---|---|---|---|---|
| 30 | Adipic (10) | Dimer (1) | EDR-192 (10) | ED-600 (1) | Yes | −16 | 132 |
| 31 | Adipic (4) | Dimer (1) | EDR-192 (4) | ED-600 (1) | Yes | −23 | 118 |
| 32 | Adipic (2) | Dimer (1) | EDR-192 (2) | ED-600 (1) | No | −32 | — |
| 33 | Adipic (10) | Dimer (1) | EDR-192 (10) | ED-900 (1) | Yes | −16 | 134 |
| 34 | Adipic (4) | Dimer (1) | EDR-192 (4) | ED-900 (1) | Yes | −29 | 127 |
| 35 | Adipic (2) | Dimer (1) | EDR-192 (2) | ED-900 (1) | No | −41 | — |
| 36 | Adipic (10) | Dimer (1) | EDR-192 (10) | ED-2001 (1) | Yes | −54 | 138 |
| 37 | Adipic (4) | Dimer (1) | EDR-192 (4) | ED-2001 (1) | Yes | −54 | 138 |
| 38 | Adipic (2) | Dimer (1) | EDR-192 (2) | ED-2001 (1) | Yes | −28 | 38 |

TABLE VI

Thermal Properties (°C.) of Various Polyamides Using Triethylene Glycol Diamine

| Molar Ratio: Adipic Acid-EDR 192 to Dimer Acid-Polyetheramine | | Polyoxyalkylene Diamine | | |
|---|---|---|---|---|
| | | ED 600 | ED 900 | ED 2001 |
| 10:1 | $T_m$ | 132 | 134 | 138/37 |
| | $T_g$ | −16 | −16 | −54 |
| | (Ex.) | (30) | (33) | (36) |
| 4:1 | $T_m$ | 118 | 127 | 138/38 |
| | $T_g$ | −23 | −29 | −54 |
| | (Ex.) | (31) | (34) | (37) |
| 2:1 | $T_m$ | — | — | 38 |
| | $T_g$ | −32 | −41 | −28 |
| | (Ex.) | (32*) | (35*) | (38) |

*denotes water insoluble.

The dynamical mechanical response of the material of Example 21 shown in Tables III and IV is displayed in FIG. 1. This data confirms the fact that the $T_g$ measured by DSC is due to the polyether component (measured at −30° C. by DSC, whereas the loss peak in the DMS spectrum occurs at −32° C.) The DMS spectrum does reveal a $T_g$ for the polymer which occurs at the somewhat higher temperature of 13° C., however, because this transition is quite broad, it is generally difficult to detect by DSC.

As expected, the water solubility of these polymers is determined by the competing effects of the hydrophilic and the hydrophobic components. For example, as the relative concentration of the lower molecular weight polyoxyalkyleneamines (JEFFAMINE ED-600 and JEFFAMINE ED-900 diamines) was decreased (compared to the more hydrophobic components), water insolubility was observed. However, at these same molar ratios, water solubility could be achieved by using a higher molecular weight polyoxyalkyleneamine (JEFFAMINE ED-2001 diamine). Thus, by using the approach as indicated above, it should be possible to synthesize a polymer with specific temperature and water solubility characteristics by judicial choice of components in the polyamide formulation.

TABLE VII

Polyether Polyamides from Adipic Acid and Two Diamines

| Ex. | Dibasic Acid (moles) | Diamine (moles) | | Water Soluble | $T_g$ (°C.) | $T_m$ (°C.) |
|---|---|---|---|---|---|---|
| 39 | Adipic (1) | EDR-148 (0.5) | D-400 (0.5) | Yes | −8 | 117 |
| 40 | Adipic (1) | EDR-192 (0.5) | D-400 (0.5) | Yes | −12 | — |
| 41 | Adipic (1) | ED-600 (0.5)  | D-400 (0.5) | Yes | −31 | — |
| 42 | Adipic (1) | EDR-148 (0.5) | D-230 (0.5) | Yes | 3 | 117 |
| 43 | Adipic (1) | EDR-192 (0.5) | D-230 (0.5) | Yes | 8 | — |

TABLE VIII

Polyether Polyamides from One Dibasic Acid and Two Diamines

| Ex. | Dibasic Acid (1 mole) | Diamine (moles) | | Water Soluble | $T_g$ (°C.) | $T_m$ (°C.) |
|---|---|---|---|---|---|---|
| 44 | Azelaic | ED-600 (0.5)  | EDR-148 (0.5) | Yes | −32.5 | 91.5 |
| 45 | "       | ED-900 (0.5)  | EDR-148 (0.5) | Yes | −43.5 | 88.5 |
| 46 | "       | ED-2001 (0.5) | EDR-148 (0.5) | Yes | −35  | 38 |
| 47 | "       | ED-600 (0.5)  | EDR-192 (0.5) | Yes | −34  | 87 |
| 48 | "       | ED-900 (0.5)  | EDR-192 (0.5) | Yes | −44  | 84 |
| 49 | "       | ED-2001 (0.5) | EDR-192 (0.5) | Yes | −35  | 38 |
| 50 | "       | ED-600 (0.5)  | D-400 (0.5)   | Yes | −37  | — |
| 51 | "       | ED-900 (0.5)  | D-400 (0.5)   | Yes | −47  | 11 |
| 52 | "       | ED-2001 (0.5) | D-400 (0.5)   | Yes | −33  | 38 |
| 53 | Dodecanedioic | ED-600 (0.5)  | EDR-148 (0.5) | No | −42 | 124 |
| 54 | "       | ED-900 (0.5)  | EDR-148 (0.5) | No | −52  | 118.5 |
| 55 | "       | ED-2001 (0.5) | EDR-148 (0.5) | No | —    | 111/38 |
| 56 | "       | ED-600 (0.5)  | EDR-192 (0.5) | No | −41.5 | 109.5 |
| 57 | "       | ED-900 (0.5)  | EDR-192 (0.5) | No | −51  | 106 |
| 58 | "       | ED-2001 (0.5) | EDR-192 (0.5) | No | —    | 102/35 |
| 59 | "       | ED-600 (0.5)  | D-400 (0.5)   | No | −41  | 36 |
| 60 | "       | ED-900 (0.5)  | D-400 (0.5)   | No | −49  | 33 |
| 61 | "       | ED-2001 (0.5) | D-400 (0.5)   | No | −33  | 38 |

Based upon the above results, it was decided to investigate the polymers produced from triethylene glycol diamine (JEFFAMINE EDR-148), adipic acid, $C_{36}$ dimer acid and the three polyoxyalkyleneamines in more detail by testing for physical properties. Table IX shows the resulting values for various physical properties for these materials, as well as for the triethylene glycol diamine/adipic acid polyamide and commercial nylon-6. Comparing the EDR-148/adipic acid polyamide to commercial nylon-6, it is found that the polyamide has a lower flexural modulus and a slightly higher yield strength.

As Table IX reveals, when the $C_{36}$ dimer acid and the polyoxyalkyleneamine is incorporated into the adipic acid/EDR-148 polyamide, the flexural modulus and yield strength decrease. For the particular samples displayed in Table IX, the mole ratio of the components were EDR-148 (10 moles), adipic acid (10 moles), $C_{36}$ dimer acid (1 mole) and the polyoxyalkyleneamine (1 mole). The flexibility of these latter two components accounts for the decrease in these mechanical properties. The flexibility of the polyether backbone is also reflected by the modulus and strength decrease of the polyamide as the molecular weight of the polyether increases.

TABLE IX

Mechanical Properties of the Polyamides Based On: EDR-148 (10 moles), Adipic Acid (10 moles), $C_{36}$ Dimer Acid (1 mole) and a Polyoxyalkylenediamine (1 mole)

| Property | Nylon-6 | Adipic/ EDR-148 | EDR-148/Adipic/ $C_{36}$ Dimer/ED | | |
|---|---|---|---|---|---|
| | | | ED-600 | ED-900 | ED-2001 |
| Flex Modulus (MPa) | 730 | 670 | 260 | 220 | 190 |
| Yield Strength (MPa) | 36 | 39 | 14 | 10 | 7 |
| (Example) | | | (21) | (24) | (27) |

The properties of the polyamide can also be controlled by adjusting the mole ratio of components. This property control is shown in Table X, where the mole ratio of the $C_{36}$ dimer acid/polyether is increased relative to the EDR-148 and adipic acid. It might be noted that there was also evidence that the degree of crystallinity also decreased as the concentration of the more flexible components was increased. Thus, it appears that it is possible to produce these water soluble polyamides with a wide range of mechanical properties by adjusting the molar ratio of reactants.

TABLE X

Mechanical Properties of the Polyamides Showing the Effect of Changing the Molar Ratio of the EDR-148/Adipic Acid: $C_{36}$ Dimer Acid/JEFFAMINE ED-900

| Property | Adipic/ EDR-148 | EDR-148/Adipic/ $C_{36}$ Dimer/ED-900 | |
|---|---|---|---|
| | | 10:1 Ratio | 4:1 Ratio |
| Flexural Modulus (MPa) | 670 | 220 | 140 |
| Yield Strength (MPa) | 39 | 10 | 4.5 |
| (Example) | | (24) | (25) |

The Examples have shown that a wide variety of water soluble polyamides can be synthesized using dicarboxylic acids with polyoxyalkylene diamines and/or poly(alkylene glycol) diamines. Depending on the particular components and concentrations used in the formulation, it has been shown that a wide variety of thermal and mechanical properties can be achieved, as well as control over the degree of water solubility.

Many modifications may be made in the process of this invention without departing from the spirit and scope thereof which are defined only in the appended claims. For example, one skilled in the art may discover that particular reaction conditions, sequences, diamines and dicarboxylic acids which may not be explicitly recited herein, but which are nevertheless anticipated, would give optimal or otherwise desirable results.

GLOSSARY

JEFFAMINE D-190  Polyoxypropylene diamine having the structure:

$$NH_2\!-\!(CH\!-\!CH_2\!-\!O)_{\overline{2}}CH_2\!-\!CH\!-\!NH_2$$
with $CH_3$ groups on each $CH$ JEFFAMINE D-230  Polyoxypropylene diamine having the structure:

$$NH_2\!-\!(CH\!-\!CH_2\!-\!O)_{\overline{3}}CH_2\!-\!CH\!-\!NH_2$$
with $CH_3$ groups on each $CH$ JEFFAMINE D-400  Polyoxypropylene diamine having the structure:

$$NH_2\!-\!(CH\!-\!CH_2\!-\!O)_{\overline{6}}CH_2\!-\!CH\!-\!NH_2$$
with $CH_3$ groups on each $CH$

We claim:

1. A water soluble polyamide produced by a process comprising the steps of:
   (a) reacting
      (i) at least one low molecular weight dicarboxylic acid having from 5 to 12 carbon atoms, or ester thereof;
      (ii) at least one poly(alkylene glycol) diamine having the formula:

$$NH_2\!-\!(CH\!-\!CH_2\!-\!O)_{\overline{x}}CH\!-\!CH_2\!-\!NH_2$$
with $R$ groups on each $CH$ where x ranges from about 2 to 5, R is hydrogen or an alkyl of one to four carbon atoms;
      (iii) at least one polyoxyalkylene diamine having the formula:

$$NH_2CH\!-\!CH_{\overline{a}}(O\!-\!CH\!-\!CH_2)_{\overline{a}}(OCH_2CH_2)_{\overline{b}}(O\!-\!CH\!-\!CH)_{\overline{c}}NH_2$$
with $R'$ groups where the sum of a+c ranges from about 2 to 8, b ranges from about 12 to about 50 and R' is an alkyl group of one to four carbon atoms; and
      (iv) at least one high molecular weight dicarboxylic acid having from about 20 to about 36 carbon atoms, or ester thereof;
   where the mole ratios of (i) to (iii), (ii) to (iii), (i) to (iv) and (ii) to (iv) are all at least 2:1; and
   (b) recovering the water soluble polyamide.

2. The water soluble polyamide of claim 1 where the mole ratios of (i) to (iv) and (ii) to (iv) are at least 4:1 and the mole ratios of (i) to (iii) and (ii) to (iii) are at least 4:1.

3. The water soluble polyamide of claim 1 where the low molecular weight dicarboxylic acid is adipic acid and the high molecular weight dicarboxylic acid is dimer acid.

4. The water soluble polyamide of claim 1 where in the (ii) polyoxyalkylene diamine, R is hydrogen and x ranges from about 2 to 3.

5. The water soluble polyamide of claim 1 where in the (iii) polyoxyalkylene diamine, R' is methyl and the sum of a+c ranges from about 3 to 4.

6. A water soluble polyamide produced by a process comprising the steps of:
   (a) reacting
      (i) at least 4 moles of adipic acid, or ester thereof;
      (ii) at least 4 moles of a poly(ethylene glycol) diamine having the formula $NH_2-(CH_2CH_2O)_xCH_2CH_2NH_2$ where x ranges from about 2 to 3;
      (iii) one mole of a polyoxyalkylene diamine having the formula:

$$NH_2CH\!-\!CH_{\overline{a}}(O\!-\!CH\!-\!CH_2)_{\overline{a}}(OCH_2CH_2)_{\overline{b}}(O\!-\!CH\!-\!CH)_{\overline{c}}NH_2$$
with $R'$ groups where the sum of a+c ranges from about 3 to 4, b ranges from about 12 to about 50 and R' is an alkyl group of one to two carbon atoms; and
      (iv) one mole of dimer acid; and
   (b) recovering the water soluble polyamide.

7. The water soluble polyamide of claim 6 where the mole ratio of (i) and (ii) to (iv) is at least 10:1 and the mole ratio of (i) and (ii) to (iii) is at least 10:1.

8. A method of producing a water soluble polyamide by a process comprising the steps of:
   (a) reacting
      (i) at least one low molecular weight dicarboxylic acid having from 5 to 12 carbon atoms, or ester thereof;
      (ii) at least one poly(alkylene glycol) diamine having the formula:

$$NH_2\!-\!(CH\!-\!CH_2\!-\!O)_{\overline{x}}CH\!-\!CH_2\!-\!NH_2$$
with $R$ groups on each $CH$ where x ranges from about 2 to 5, R is hydrogen or an alkyl of one to four carbon atoms;
      (iii) at least one polyoxyalkylene diamine having the formula:

$$NH_2CH\!-\!CH_{\overline{a}}(O\!-\!CH\!-\!CH_2)_{\overline{a}}(OCH_2CH_2)_{\overline{b}}(O\!-\!CH\!-\!CH)_{\overline{c}}NH_2$$
with $R'$ groups where the sum of a+c ranges from about 2 to 8, b ranges from about 12 to about 50 and R' is an alkyl group of one to four carbon atoms; and
      (iv) at least one high molecular weight dicarboxylic acid having from about 20 to about 36 carbon atoms, or ester thereof; and
   where the mole ratios of (i) to (iii), (ii) to (iii), (i) to (iv) and (ii) to (iv) are all at least 2:1; and
   (b) recovering the water soluble polyamide.

9. The water soluble polyamide of claim 8 where the mole ratios of (i) to (iv) and (ii) to (iv) are at least 4:1 and the mole ratios of (i) to (iii) and (ii) to (iii) are at least 4:1.

10. The method of claim 8 where the low molecular weight dicarboxylic acid is adipic acid and the high molecular weight dicarboxylic acid is dimer acid.

11. The method of claim 8 where in the (ii) polyoxyalkylene diamine, R is hydrogen and x ranges from about 2 to 3.

12. The method of claim 8 where in the (iii) polyoxyalkylene diamine, R' is methyl and the sum of a+c ranges from about 3 to 4.

13. A method of producing a water soluble polyamide by a process comprising the steps of:
(a) reacting
  (i) adipic acid, or ester thereof;
  (ii) a poly(ethylene glycol) diamine having the formula NH$_2$—(CH$_2$CH$_2$O)$_x$CH$_2$CH$_2$NH$_2$ where x ranges from about 2 to 3;
  (iii) a polyoxyalkylene diamine having the formula:

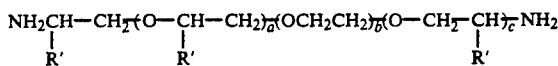

where the sum of a+c ranges from about 3 to 4, b ranges from about 12 to about 50 and R' is an alkyl group of one to two carbon atoms; and
  (iv) dimer acid; and
where the mole ratios of (i) to (iii), (ii) to (iii), (i) to (iv) and (ii) to (iv) are all at least 4:1; and
(b) recovering the water soluble polyamide.

14. The method of claim 13 where the mole ratio of (i) and (ii) to (iv) is at least 10:1 and the mole ratio of (i) and (ii) to (iii) is at least 10:1.

* * * * *